United States Patent
Bonnifait et al.

(10) Patent No.: US 7,206,743 B2
(45) Date of Patent: Apr. 17, 2007

(54) METHOD AND APPARATUS FOR EVALUATING THE VOICE QUALITY OF TELEPHONE CALLS

(75) Inventors: Michel Bonnifait, Lannion (FR); Michel Le Clec'H, Perros Guirec (FR)

(73) Assignee: France Telecom, Paris (FR)

( * ) Notice: Subject to any disclaimer, the term of this patent is extended or adjusted under 35 U.S.C. 154(b) by 809 days.

(21) Appl. No.: 10/227,731

(22) Filed: Aug. 26, 2002

(65) Prior Publication Data

US 2003/0069011 A1 Apr. 10, 2003

Related U.S. Application Data

(63) Continuation of application No. PCT/FR01/04028, filed on Dec. 18, 2001.

(30) Foreign Application Priority Data

Dec. 26, 2000 (FR) ................................. 00 17137

(51) Int. Cl.
*G10L 21/00* (2006.01)
*H04Q 7/20* (2006.01)

(52) U.S. Cl. .................. 704/270; 455/423; 379/28; 370/252; 370/241; 709/224

(58) Field of Classification Search ................ 704/233, 704/200.1, 270–275; 370/252, 241; 379/1.02, 379/28; 455/423; 709/224; 706/25
See application file for complete search history.

(56) References Cited

U.S. PATENT DOCUMENTS 5,799,133 A * 8/1998 Hollier et al. ................ 706/25
5,812,653 A 9/1998 Pilkington et al.
6,275,797 B1 * 8/2001 Randic ........................ 704/233
6,370,120 B1 * 4/2002 Hardy ......................... 370/252
6,389,111 B1 * 5/2002 Hollier et al. ................ 379/28

(Continued)

OTHER PUBLICATIONS

Ramsden, D.B., "In-Service, Non-Intrusive Measurement on Speech Signals", Proceedings of the Global Telecommunications Conference, IEEE, vol. 3 p. 1761-1764 (Dec. 2, 1991).

(Continued)

*Primary Examiner*—Vijay B. Chawan
(74) *Attorney, Agent, or Firm*—Cohen Pontani Lieberman & Pavane LLP

(57) ABSTRACT

The voice quality of telephone calls is evaluated. A first connection is established between a computerized apparatus and a person acting as a first experimenter, and a second connection is established between the platform and a second experimenter. The first and second connections are interconnected by the computerized apparatus to establish a call between the two experimenters and enable them to converse, the apparatus being cut into the call in order to acquire data about the call. The experimenters' opinions are solicited concerning their perceptions of the quality level they observe during their conversation. The apparatus evaluates consistency of the data collected with the nominal experimental conditions and the nominal quality level associated with the current test. Then, a determination is made as to how the current test is to be carried out as a function of a test plan and of the result of the evaluation. The test plan is set up by specifying nominal conditions for the experiment and nominal quality levels for carrying out the tests, and in collecting data during the tests.

28 Claims, 4 Drawing Sheets

U.S. PATENT DOCUMENTS

| | | | |
|---|---|---|---|
| 6,445,916 B1 * | 9/2002 | Rahman | 455/423 |
| 6,665,271 B1 * | 12/2003 | Thomas et al. | 370/252 |
| 6,748,433 B1 * | 6/2004 | Yaakov | 709/224 |
| 6,834,040 B2 * | 12/2004 | Tomberlin | 370/241 |
| 6,985,559 B2 * | 1/2006 | Hardy | 379/1.02 |
| 2002/0167937 A1 * | 11/2002 | Goodman | 370/352 |

OTHER PUBLICATIONS

South, C.R., "In-Service, Non-Instrusive Assessment of Telephony Channels-An Introduction", BT Technology Journal, vol. 10, No. 2 p. 13-17 (Apr. 1, 1992).

Kitawaki, "Research of Objective Speech Quality Assessment", NTT Review. Telecommunications Association, vol. 3, No. 5 p. 65-70 (Sep. 1, 1991).

* cited by examiner

METHOD AND APPARATUS FOR EVALUATING THE VOICE QUALITY OF TELEPHONE CALLS

This application is a continuation of International Application PCT/FR01/04028 filed Dec. 18, 2001.

FIELD OF THE INVENTION

The present invention relates to a method and apparatus of measuring, collecting and processing data relating to the quality of voice calls transmitted over a telecommunications network.

BACKGROUND OF THE INVENTION

A highly advantageous application of the invention lies in improving the reliability of subjective evaluation of the voice quality of telephone calls conveyed by mobile networks. This subjective evaluation often leads to the voice quality of telephone calls conveyed by mobile networks being judged to be inferior to the voice quality of telephone calls conveyed by fixed networks. However, the voice quality of telephone calls constitutes an element that is changing. Firstly, the voice quality of mobile calls is expected to improve in the near future to reach the voice quality presently available from fixed networks. Secondly, transporting voice by means of packet switching techniques, in particular by so-called Internet Protocol ("IP") techniques, might lead to the voice quality of fixed networks becoming degraded. Such degradation could occur specifically while implementing large-scale deployment of that type of transfer mode. This changing nature in the voice quality of calls requires there to be methods for evaluating such voice quality. Evaluation must be reliable so that any means defined on the basis of such evaluation and, in particular, any devices for correcting voice signals, such as echo cancellers, can be as effective as possible.

Two types of methods for evaluating voice quality have been used. A first type relies on objective methods of measurement that use test signals which reproduce signals similar to human speech. Voice quality evaluation is performed by analyzing physical characteristics of signals as received after they have been transmitted through a telecommunications network. Analysis can be time-based, frequency based, or it can relate to the power of the received signals. A drawback of those methods is that they use artificial signals that simulate speech rather than real speech signals.

A second type of method relies on subjective methods of measurement. This type includes a first category which utilizes human participants, referred to herein as experimenters, who passively listen to received signals and evaluate the signal quality. A second category makes use of active experimenters. Active experimenters converse in genuine telephone calls and then give their opinions concerning how they perceived the voice quality of the signals during the conversation. Although subjective, these methods are particularly useful in the field of voice signals since the ear constitutes a good instrument for measuring such signals.

Nevertheless, in order to obtain an accurate and reliable evaluation of voice quality, subjective measurement methods require a large number of experimenters. When the number is small, the accuracy of evaluation is highly dependent on the performance quality of each experimenter, and also on the conditions relating to the test environment.

SUMMARY OF THE INVENTION

One object of the invention is to provide an improved technique for evaluating the voice quality of telephone calls.

Another object of the invention is to evaluate the voice quality of telephone calls using subjective measurements obtained with experimenters.

A further object of the invention is to perform such subjective measurements with a small number of experimenters while still obtaining data that is reliable.

Yet another object of the invention is to provide an automatic technique for evaluating the voice quality of telephone calls by controlling with a platform the communication between experimenters.

These and other objects are attained in accordance with one aspect of the present invention directed to a method for evaluating the voice quality of telephone calls. In accordance with the method, a first connection is established between a platform (as defined below) and a first experimenter, and a second connection is established between the platform and a second experimenter. The first and second connections are interconnected by the platform to establish a call between the two experimenters and enable them to converse with each other, the platform being cut into the call in order to acquire data about the call. The experimenters' opinions are obtained concerning their perceptions of the voice quality they note during their conversation. The platform evaluates consistency of the information collected from the experimenters with nominal experimental conditions and nominal quality levels associated with the current test. Then, a determination is made as to how the current test is to be carried out as a function of a test plan and of the result of the evaluation. The test plan is set up by specifying nominal experimental conditions and nominal quality levels for carrying out the tests, and in collecting data during the tests.

The term "test plan" as used herein refers to a list of tests to be performed by an experimenter or experimenters and, for each test, a description of how the test is to be carried out, including the nominal experimental conditions and the nominal quality levels specified therefor.

A second aspect of the present invention is directed to a platform for evaluating the voice quality of telephone calls. The platform comprises computation means having platform management software installed thereon, means giving access to the telecommunications network in connection with the computation means, and a signal processor means coupled with the computation means. The access giving means includes at least one telecommunications network interface, and a direct interface with signal processor means. The signal processor means includes a direct interface with the telecommunications network access means, and a software module that measures voice parameters.

The computation means and the signal processing means can be combined in single means fitted with a computation component that is sufficiently powerful to perform simultaneously both the operations of managing the platform and the operations of processing the signal.

DETAILED DESCRIPTION OF THE DRAWINGS

Initially, a test plan is created that specifies various nominal experimental conditions and nominal quality levels for carrying out tests designed to evaluate the voice quality of telephone calls. For example, nominal experimental conditions are conditions that are selectable, such as the location of the experimenter during the test (e.g. home, street, subway station), whether the phone to be used is a mobile phone or a fixed phone, the text for a phone conversation between the experimenters, the duration of their conversation, and whether an experimenter with a mobile phone should move during the conversation from one location to another. The nominal quality levels are, for example, categorizing the environmental noise level at the experimenter's location as "quiet", "noisy" and "very noisy", and setting the signal to noise ratio into the categories of >10 dB and >20 dB. Thus, one example for conducting a test is to set the nominal experimental condition for noise level as "quiet", such as in a home or a side street, and setting the nominal quality level for that location as a signal to noise ratio of >10 dB.

Figure 1:
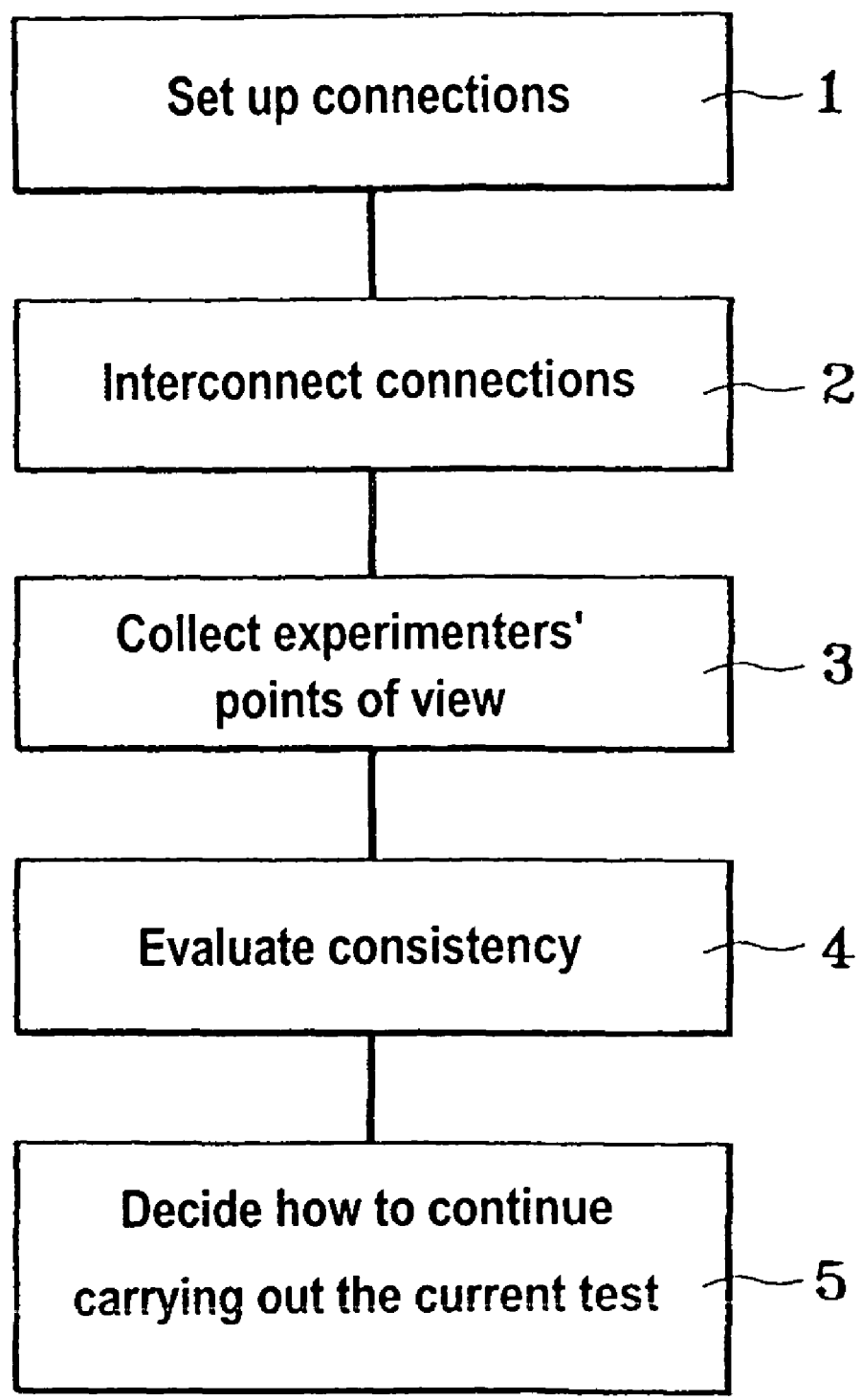
FIG. 1 is a generalized flow chart showing the main operations performed in accordance with the invention.

Turning now to FIG. 1, it is assumed that the test plan has been created previously. To perform the invention, step 1 sets up a first connection between a first experimenter (experimenter "A") and a platform, and then a second connection is set up between a second experimenter (experimenter "B")and the platform. Each experimenter has a telephone unit, of course.

It should be understood that the term "platform" as used herein refers to equipment that includes a computation means, such as a personal computer fitted with an internal bus, a means giving access to a telecommunications network, and a signal processor means. The means giving access to the telecommunications network can be a circuit board fitted with an interface to the internal bus of the personal computer, at least one digital interface to the telecommunications network, a direct interface to signal processor means, and a software module for handling incoming and outgoing calls. The signal processor means can be a circuit board connected to the computer by means of the internal bus.

In step 2, the first and second connections are interconnected via the platform to set up a call between the two experimenters, the platform being cut into the call to acquire data about the call.

In step 3, the opinions of the experimenters are obtained concerning their perceptions about the noise quality level they noted during their conversation.

In step 4, the platform evaluates the consistency of the information collected from the experimenters with the nominal experimental conditions and the nominal quality levels associated with the current test.

In step 5, the invention determines how the test is to be carried out as a function of the test plan and as a function of the result of the evaluation.

A particular embodiment of the platform for the invention is described with reference to FIG. 2.

The platform comprises computation means 10, means 11 giving access to the telecommunications network in connection with the computation means, and means 12 for processing signals in connection with the computation means. As pointed out above, means 10 and 12 can be combined.

The computation means 10 typically comprise a personal computer fitted with an internal bus 13 and having software 14 installed therein for controlling the platform. The computation means 10 could be any equivalent means possessing computation, memory, and internal and external interface resources, such as a server.

The means 11 giving access to the telecommunications network is typically an electronic circuit board fitted with:

at least one network interface 15 to the telecommunications network;

a software module 16 for handling incoming and outgoing calls;

a software module 17 for handling dual-tone multifrequency (DTMF) codes as emitted by a telephone or a speech recognizer module for recognizing key words uttered by the experimenters;

a direct interface 18 coupled to the signal processor means; and an interface 19 coupled to the internal bus 13 of the personal computer.

The network interface 15 of the network access means 11 is typically digital, for example of the integrated services digital network (ISDN) type, or of the high data rate type. Such an interface has the advantage of introducing little or no degradation to the signals. Consequently, the influence of the interface can be ignored. The means 11 communicates with the personal computer 10 via the internal bus 13.

The signal processor means 12 is typically a circuit board comprising:

a direct interface 20 coupled to the network access means 11;

a network interface 12A to the telecommunications network;

an interface 12B coupled to the internal bus 13 of the personal computer; and a software module 21 for measuring voice parameters.

The signal processor means 12 is fitted with a processor and memories enabling it to operate signal processing algorithms. In a particular embodiment, the processor is a digital signal processor (DSP) or a reduced instruction set computer (RISC). The signals that are processed are measurements of voice parameters made during the telephone conversation between the during the telephone conversation between the experimenters, such as speech signal level and echo level, and also of sound environment parameters that are measured, as explained below.

Figure 2:
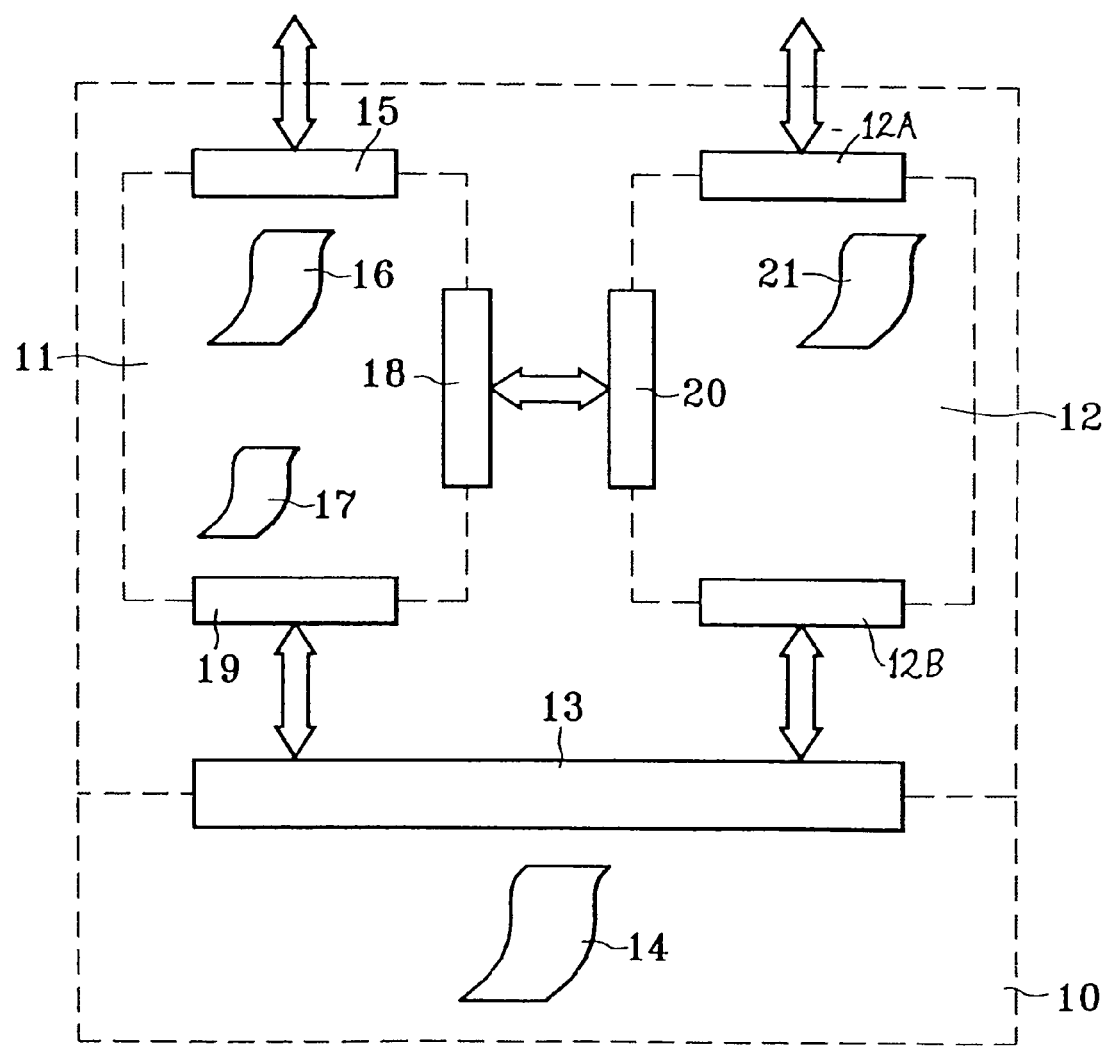
FIG. 2 is a block diagram showing the main components of a platform arranged in accordance with the invention.
Figure 3A:
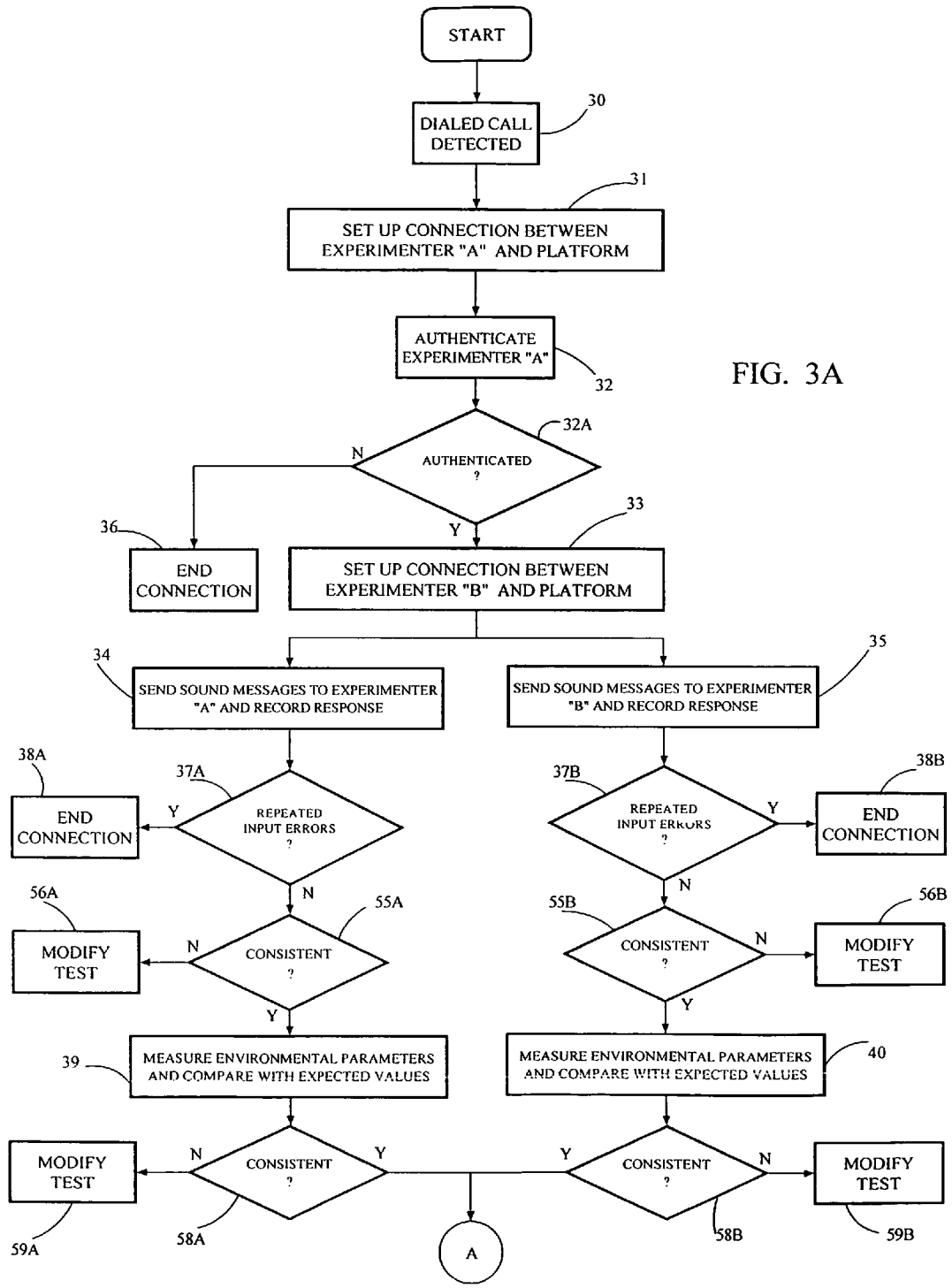
FIGS. 3A and 3B, when combined, depict a flow chart of specific operations performed by the platform of the invention as shown in FIG. 2, and which is a detailed version of the operations shown in FIG. 1.
Figure 3B:
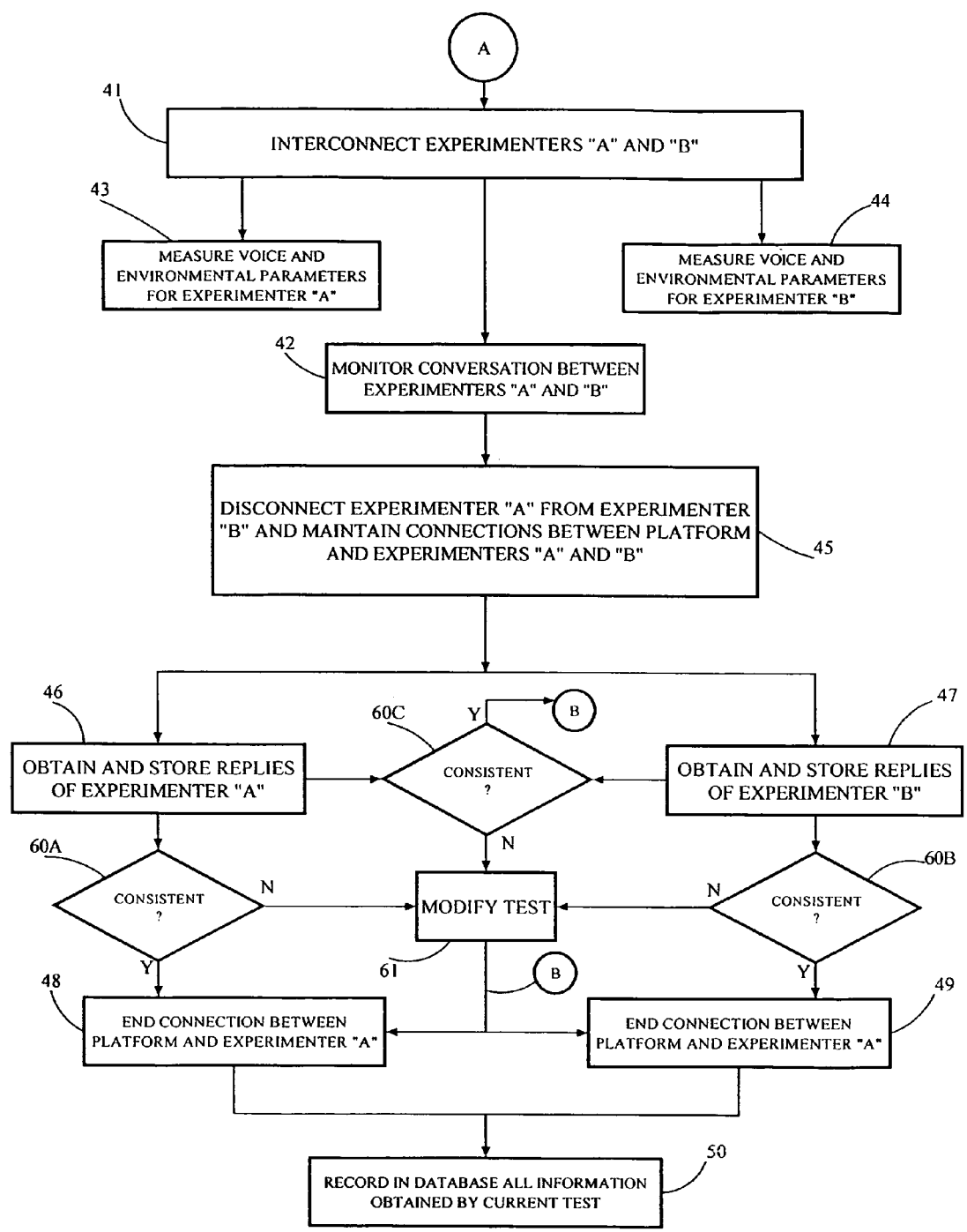

FIG. 3A and 3B depict, in combination, a flowchart of various operations carried out in accordance with the invention by the platform shown in FIG. 2. The platform responds to experimenter "A" as he dials the telephone number of the platform, as per 30. When the platform answers, the invention (11, 14, 16 in FIG. 2) sets up a first connection between the experimenter "A" and the platform, as per 31. To avoid any unauthorized use of the platform, and in particular any use by experimenter "A" for private purposes, an authentication operation is performed, as per 32. The platform (11, 14 in FIG. 2) asks the experimenter to supply an authentication number, and possibly also a name for identification purposes. This authentication number was previously provided to the experimenter, such as via mail, and its duration of validity can be limited and set by the platform.

After the experimenter has been authenticated, as determined per 32A, the platform (11, 14) prompts experimenter "A" to dial the number of the experimenter "B", and the platform (11, 16, 14) uses this number to set up a second connection with the experimenter "B", per 33. The platform thus handles two connections, a first connection with the experimenter "A" and a second connection with the experimenter "B".

If an invalid authentication number is input and the authentication fails, as determined per 32A, the connection between experimenter "A" and the platform is terminated, and the test is discontinued, as per 36.

In a variant, the platform could establish more than two connections. In particular, depending on the test plan, it might be necessary to set up a call with more than two experimenters, such as with three experimenters. Under such conditions, the platform sets up as many connections as there are experimenters needed to evaluate voice quality for a given call.

After experimenters "A" and "B" are individually connected to the platform, the platform (11, 14) runs a preliminary test stage. During this stage, the platform (11, 14) sends audio messages to each of the experimenters, and each experimenter responds, as per 34, 35. The experimenters respond either by selecting a key on the keypad or else by uttering one or more key words. The ability to respond by use of key words is provided by a particular embodiment of the platform which includes speech recognition equipment (17).

Throughout this preliminary stage, the platform (14) analyzes the responses given by each of the experimenters. This analysis serves to detect erroneous inputs, attempts at gaining access by people who are not authorized, and situations that do not comply with carrying out the test plan (collectively referred to as "input errors"). If an input error is detected, the platform can repeat a question and ask the responsible experimenter to input a response again. In the event repeated input errors are detected, as per 37A and 37B, the platform (11, 14, 16) can interrupt the connections and cease carrying out the test, as per 38A, 38B.

During this preliminary stage, the platform (11, 14) compares the nominal experimental conditions applicable to the current test with the information obtained from the experimenters when they are asked, per 34, 35, to describe their actual experimental conditions, for example. More specifically, say Test No. 1 is to have a "quiet" noise level for testing voice quality with a mobile phone. The experimenter is instructed to arrive at a suitable site, such as a side street named XYZ. The platform asks the experimenter "Are you on the street named XYZ?" The experimenter then inputs "YES". The platform checks this input for consistency with the nominal experimental condition, as per 55A and 55B. If the response is inconsistent, i.e., the experimenter has answered "NO", the platform can modify the test, as per 56A, 56B, by giving the experimenter suitable instructions, such as moving to another location, canceling the test, or delaying it for later.

For soliciting the experimenter's response in 34, 35, rather than using audio messages for each question, the platform can also refer the experimenter to specific questions listed on a printed version of instructions for carrying out the tests that was previously supplied to the experimenters, such as via mail.

In order to limit problems with inputting responses, confirming them or invalidating them, the responses can be associated with respective designated keys of the telephone keypad. In one particular implementation, a YES is entered pressing the * key and a NO is entered by pressing the # key of the keypad.

When consistent responses are obtained in steps 34, 35 during this preliminary stage, the invention proceeds with the platform (12, 21) recording information relating to the surroundings or environment of the respective experimenters, as per 39, 40. This information is input by the experimenters or is the result of measurements performed by the platform (12, 21) during periods when there is no speech signal. This information can relate, for example, to radio signal level if a mobile phone is in use, and to the environmental noise level at the experimenter's location. Thus, during a period when there is no speech signal, the platform picks up background noise from the phone and measures noise level in order to evaluate actual environmental conditions. In a complementary manner, the platform may perform attenuation measurements and echo delay measurements by analyzing any echo of the messages sent out by the platform itself or the echo of voice signals coming from the experimenters.

In one possible situation that can arise, such as in Test No. 1 described above, the experimenter has a mobile phone and is supposed to be in a "quiet" side street whereas the real, measured noise level happens to be well above the expected nominal level. When measured conditions differ from the nominal conditions designated for the current test, as determined by 58A and 58B, the test is modified by 59A and 59B. The experimenter is informed (11, 14) by an audio message and is then asked to correct the situation (in the event of an incorrect site, for example). Alternatively, under such circumstances the test can be continued with the experimenter remaining in place, but subsequent analysis of the information gained needs to take into account the real noise level as recorded.

Steps 56A, 56B, 59A and 59B are not depicted as leading to the performance of any further steps because one of the contemplated "modifications" of the test is its termination. However, it is readily recognized by one with ordinary skill in the art that a "modification" other than termination of the test will lead to the appropriate operation(s) from among those depicted.

At the end of the preliminary stage, the platform (11, 16) acts in step 41 (FIG. 3B) to interconnect the two connections and set up a call between the two experimenters. This interconnection can be done in two different ways, depending on the purpose of the test. When the test involves evaluating all of the elements in the telecommunications network that has been used for setting up the call between the experimenters, then the mode used is said to be "transparent". When the test is essentially for evaluating external apparatus connected to the platform, then the test mode is said to be "non-transparent".

During the time in which the connection between the experimenters is maintained, conversation takes place between the experimenters while being monitored by the platform (11, 16, 17), as per 42. Monitoring can serve, for example, to control the duration of test conversations so that they do not exceed a preset limit. During this stage, the platform (12, 21) measures, as per 43, 44, various voice parameters such as speech signal level, echo level, echo delay, and the occurrence of saturation in the signal. It also measures sound environment parameters. These measurements are performed without disturbing the call with, for example, an in-service non-intrusive measurement device (INMD). Such devices are well known and, thus, details thereof are not deemed necessary. The measurements are stored by the platform (14).

At the end of this testing stage, having a maximum duration as determined by the platform (14), the platform (11, 16) acts in step 45 to interrupt the call by breaking the interconnection between the experimenters while, nevertheless, maintaining each of the connections independently.

During the following stage, the platform (11, 14) acts, per 46, 47, to issue questions to each of the experimenters and to ask them to reply by selecting keys on the keypad or by uttering one or more key words. The platform then analyzes consistency in the replies from each of the experimenters with the measurements made by the platform as well as consistency between the replies from the two experimenters.

For example, experimenter "A" is asked, per 46, "have you been annoyed by the noise?" The options available to the experimenter for answering this question are "not at all", "slightly", "moderately", "significantly" and "greatly". Suppose the experimenter "A" inputs "greatly" whereas the platform measures a −50 dB noise level. An inconsistency will be found by the platform in such a case, per 60A, between the experimenter's answer and the noise measured by the platform. If at least one inconsistency is identified for experimenter "A", per 60A, experimenter "B", per 60B, or between experimenters "A" and "B", per 60C, the platform can modify the test, per 61, in any one of several ways. For example, the test results can be ignored entirely, the response to the particular question which produced the inconsistency can be ignored by itself with the other information being considered usable, the specific question can be repeated to the experimenter, the specific measurement can be re-done, or the entire test can be re-performed.

After all the questions in 46, 47 have been posed and the answers received and analyzed for inconsistencies, the platform can then either inform the experimenters that the test session has come to an end, if there are no more tests to follow, or else can specify experimental conditions for a new test and instruct the experimenters to call the platform after they are appropriately re-located.

When the session is to end, the platform (14, 16) releases the connections, as per 48, 49. When the connections are released, that triggers recording all of the information that has been collected in a database that is integrated in the platform, as per 50.

Thus, the invention provides for The of the quality of voice calls that enables data to be collected relating to voice call quality. In order to collect the data, the invention sets up a call between two experimenters by interconnecting two connections via the platform, each connection setting up a telephone link between an experimenter and the platform. The data collected combines data about the call set up between the two experimenters and data about current nominal conditions. Nominal conditions are conditions determined by the test plan and are known to each of the experimenters and stored in the platform. Current conditions are the conditions under which the test actually takes place. The platform evaluates consistency between nominal experimental conditions and current experimental conditions and, between the opinions of the experimenters on their perceptions of voice quality level observed during their conversation and the nominal quality level associated with the current test. If this evaluation shows lack of consistency, then the invention can modify the way in which the test plan is carried out.

Since the comparison of current conditions with nominal conditions is performed simultaneously with an ongoing test, it enables the platform to repeat a question to the experimenter. Thus, if an inconsistency is detected, then the corresponding information as collected is confirmed or invalidated by posing the follow-up question to the experimenter. Consequently, an increase in data reliability is created at the time the data is input by an experimenter, and data reliability is not dependent solely on having a large number of experimenters.

Several additional features as well as variations of above-disclosed features of the invention can be described as follows.

In one variation, the first connection is set up on the initiative of experimenter "A" dialing a telephone number of the platform. The second connection is set up at the initiative of the platform which prompts the first experimenter to dial a particular telephone number of the second experimenter. The platform thus retains control over setting up the second connection.

The invention can also determine instructions for carrying out tests based on a correspondence table between various possible responses to a question asked by the platform and the keys on the telephone keypad. This makes it possible to have a precise framework which constrains possible responses, consequently limiting input errors.

The invention also determines instructions for carrying out tests based on a correspondence table between various possible responses to a question asked by the platform and key words to be uttered by an experimenter. This facilitates implementing the method with mobile phones because it is difficult to select a key on a mobile telephone while it is pressed against an ear.

In accordance with another feature, the platform interconnects the connections via determined external equipment that is to be evaluated. In a first variant of this implementation, the call data coming from each of the experimenters is modified by the determined equipment. In a second variant of this implementation, the call data coming from only one of the experimenters is modified by the determined equipment. This implementation serves advantageously to analyze the impact of external equipment on a call, in particular when said external equipment is an echo canceller. The call data comprises speech signals in particular.

The invention also contemplates acquiring current experimental conditions includes obtaining responses from the experimenters to questions asked by the platform concerning operating conditions, voice parameter measurements, and measurements of environmental parameters that are performed in a non-intrusive manner by the platform. The method can thus compare information coming from different sources and consolidate its consistency analysis.

As explained above, the platform terminates the call by disconnecting the interconnection between the two connections. In a variant of this implementation, the platform maintains each of the two connections for a determined length of time in order to input responses from each of the experimenters to questions asked by the platform. The platform thus controls the duration of a call and handles each of the connections with each of the experimenters in independent manner.

In accordance with a further feature, the invention provides a list of experimenters authorized to call the platform, assigning to each of them an authentication number. This list serves to authenticate authorized people.

In accordance with a still further variation, the invention manages a database of authentication numbers each having a time duration during which it is valid in association with a given test. In a variant of this feature, at the end of a series of tests, the validity duration of the authentication numbers of the two experimenters is zeroed. Thus, authorization to access the platform is limited in time. This makes it possible, advantageously, to avoid any fraudulent use which might be made by said person, once the given time has elapsed.

In a further implementation, the invention sequentially repeats the following steps at the end of a test for a determined number of times:

giving the experimenters information concerning the next test;

releasing the connections with the experimenters; and performing the steps of said subjective measurement method according to any preceding implementation, during which steps the current test differs from each of the tests that have already been carried out by the pair constituted by the two experimenters. In a first variant of this implementation, the sequence of the various tests is determined for a given pair of experimenters. In a second variant of this implementation, different pairs of experimenters are used to carry out the invention in parallel. Each pair of experimenters carries out the tests in a predetermined sequence in order to minimize statistical bias in the responses of the experimenters. Thus, in this implementation, the invention makes it possible to carry out a series of n tests which are determined by the test plan. To minimize statistical bias, the number of pairs of experimenters is selected to be equal to n using the principle of the Latin square.

We claim:

1. A method for evaluating the voice quality of telephone calls, comprising:
   (a) setting up a test plan specifying nominal experimental conditions and nominal quality levels for carrying out tests and collecting data during the tests relating to the quality of voice calls transmitted over a mobile telecommunications network;
   (b) performing a current test by establishing a first connection between a platform and a first experimenter and a second connection between the platform and a second experimenter;
   (c) interconnecting the first and second connections by means on the platform to establish a call between the first and second experimenters for enabling them to converse, the platform being cut into the call in order to acquire data about the call;
   (d) acquiring current experimental conditions by collecting data including opinions of the first and second experimenters concerning their perceptions of the quality level they note during their conversation;
   (e) evaluating consistency between nominal experimental conditions and the nominal quality level associated with the current test; and
   (f) determining, as a function of the test plan and of the result of the evaluation, how performance of the current test is to be continued.

2. The method according to claim 1, in which the first connection is established on the initiative of the first experimenter dialing a telephone number of the platform.

3. The method according to claim 2, in which the second connection is established at the initiative of the platform which invites the first experimenter to dial a telephone number of the second experimenter.

4. The method according to claim 1, further comprising determining the instructions for carrying out tests based on a correspondence table between various possible responses to a question asked by the platform and the keys of a telephone keypad.

5. The method according to claim 1, further comprising determining the instructions for carrying out tests based on a correspondence table between various possible responses to a question asked by the platform and key words to be uttered by an experimenter.

6. The method according to claim 1, in which the platform interconnects the connections using external equipment that is to be evaluated.

7. The method according to claim 6, in which the call data coming from each of the experimenters is modified by the external equipment.

8. The method according to claim 6, in which the call data coming from only one of the experimenters is modified by the external equipment.

9. The method according to claim 1, in which acquiring current experimental conditions includes obtaining responses from the experimenters to questions asked by the platform concerning operating conditions, voice parameter measurements, and measurements of environment parameters that are performed in non-intrusive manner by the platform.

10. The method according to claim 1, in which the platform terminates the call by disconnecting the interconnection between the two connections.

11. The method according to claim 10, in which, after terminating the call, the platform maintains each of the two connections for a determined length of time in order to input responses from each of the experimenters to questions asked by the platform.

12. The method according to claim 1, further comprising:
    determining a list of experimenters authorized to call the platform, giving each of them an authentication number.

13. The method according to claim 12, further comprising:
    checking the authorization given to an experimenter for calling the platform by verifying the authentication number given by the experimenter following a request made by the platform.

14. The method according to claim 12, further comprising:
    managing a database of authentication numbers each having a validity duration associated with a given test.

15. The method according to claim 14, further comprising:
    at the end of a series of tests, zeroing the validity duration of the authentication numbers of the first and second experimenters.

16. The method according to claim 1, wherein, at the end of a test, the following steps are sequentially repeated for a determined number of times:
    providing the first and second experimenters with information concerning the next test;
    releasing the connections with the first and second experimenters; and
    performing the steps (b) to (f), during which steps the current test differs from each of the tests that have already been carried out by the pair constituting said first and second experimenters.

17. The method according to claim 16, in which the order of the various tests is determined for a given pair of experimenters.

18. The method according to claim 16 comprising:
    performing the method in parallel with different pairs of experimenters, the order in which the tests of the plan are carried out being specific for each pair of experimenters.

19. The method according to claim 1, further comprising:
    establishing an additional connection between each of at least one additional experimenter and the platform; and
    interconnecting each additional connection with the other connections by means of the platform to establish a call between all of the experimenters, enabling them to converse with one another, the platform being cut in on the call in order to acquire data about the call.

20. The method according to claim 1, wherein said step (e) further comprises evaluating consistency within the data collected in step (d).

21. The method according to claim 20, wherein said step (f) comprises repeating a request for information if an inconsistency is determined during the step of evaluating.

22. The method according to claim 20, wherein said step (f) further comprises instructing one of the first and second experimenters to correct an inconsistency determined during the step of evaluating.

23. The method according to claim 20, wherein said step (f) further comprises terminating the current test when an inconsistency is determined during the step of evaluating.

24. The method according to claim 1, wherein said step (f) comprises repeating a request for information if an inconsistency is determined during the step of evaluating.

25. The method according to claim 1, wherein said step (f) further comprises instructing one of the first and second experimenters to correct an inconsistency determined during the step of evaluating.

26. The method according to claim 1, wherein said step (f) further comprises terminating the current test when an inconsistency is determined during the step of evaluating.

27. A subjective measurement platform for implementing a method for evaluating the voice quality of telephone calls, the platform comprising:
   a computation device (10) having platform management software (14) installed thereon;
   a signal processor (12) connected to the computation device (10);
   access means (11) for accessing a mobile telecommunications network in connection with the computation device (10) and comprising:
      at least one mobile telecommunications network interface (15), and
      a direct interface (18) with the signal processor wherein the signal processor (12) connected with the computation device (10) comprises:
         a direct interface (20) with the mobile telecommunications network access means, and
         a software module (21) for measuring voice parameters, the platform management software including instructions for carrying out a current test according to a test plan which specifies nominal experimental conditions and nominal quality levels, wherein the instructions include establishing a first connection between the platform and a first experimenter and a second connection between the platform and a second experimenter and interconnecting the two connections using the access means (11) for accessing the mobile telecommunications network, acquiring current experimental conditions by collecting data including opinions of the first and second experimenters using the software module (21), evaluating consistency between the data collected and nominal experimental conditions and nominal quality level using the signal processor (12), and determining, as a function of the evaluation and the test plan, how to continue the current test.

28. A measurement platform according to claim 27, wherein:
   the computation device (10) is a personal computer fitted with an internal bus;
   the means (11) for accessing the telecommunications network is an access card fitted with:
      an interface (19) to the internal bus of the personal computer;
      at least one digital type interface (15) to the telecommunications network;
      a direct interface (18) to the signal processor; and
      a software module (16) for handling incoming and outgoing calls; and
   the signal processor (12) is a card fitted with a processor and memories for performing signal processing algorithms and connected to the computer by means of the internal bus.

* * * * *